United States Patent [19]

Kite

[11] Patent Number: 4,538,555
[45] Date of Patent: Sep. 3, 1985

[54] POWER PLATE

[76] Inventor: John Kite, 7130 Airline Ave., Des Moines, Iowa 50322

[21] Appl. No.: 607,425

[22] Filed: May 7, 1984

[51] Int. Cl.³ .............................................. F02B 75/18
[52] U.S. Cl. ............................ 123/52 M; 123/52 MB
[58] Field of Search .......... 123/52 M, 52 MC, 52 MB

[56] References Cited

U.S. PATENT DOCUMENTS 2,066,922  1/1937  Wolfard ........................... 123/52 M
4,356,798  11/1982  Sakaoka et al. ................. 123/52 M
4,446,824  5/1984  Endo et al. ...................... 123/52 M

FOREIGN PATENT DOCUMENTS 0028584  2/1983  Japan ................................ 123/52 M Primary Examiner—Craig R. Feinberg
Attorney, Agent, or Firm—James D. Birkenholz

[57] ABSTRACT

An apparatus is provided for the absorbtion and effective minimization of shockwaves and increased pressures occurring in and flowing backward from the combustion chamber in the intake manifold of an internal combustion engine. A pair of plates are disposed about the intake manifold include a partial tear-drop shaped circumferential chamber disposed therein communicating with the manifold into which flows the shockwaves and regions of the high pressure air-fuel mixture.

2 Claims, 6 Drawing Figures

U.S. Patent   Sep. 3, 1985   4,538,555
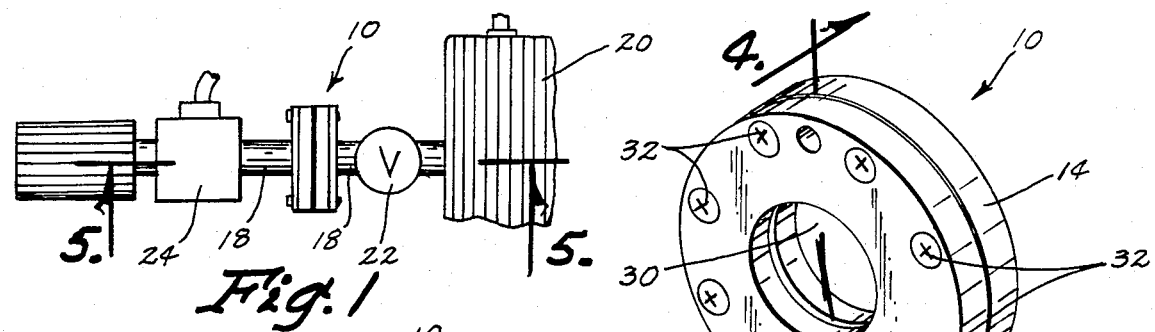
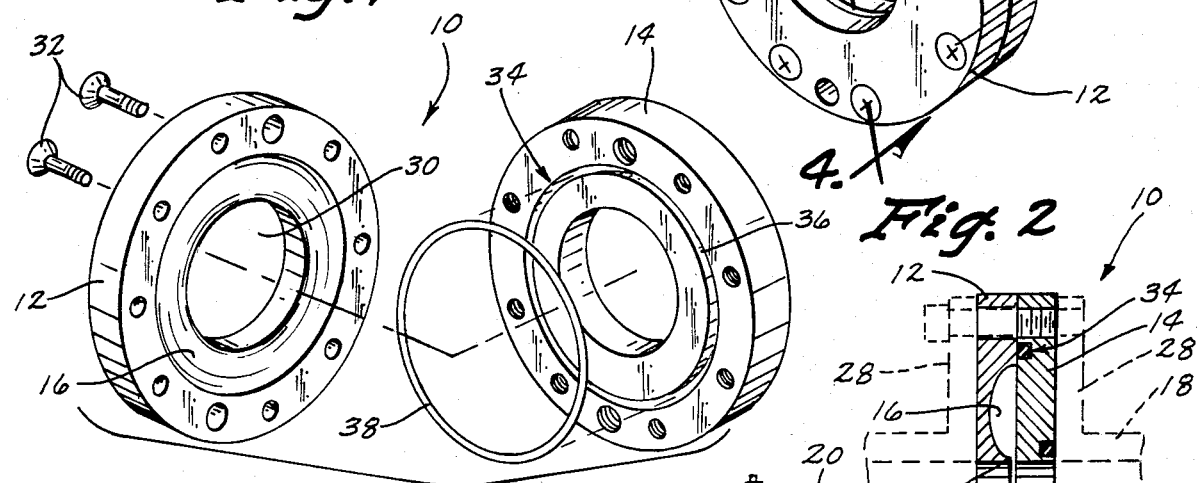
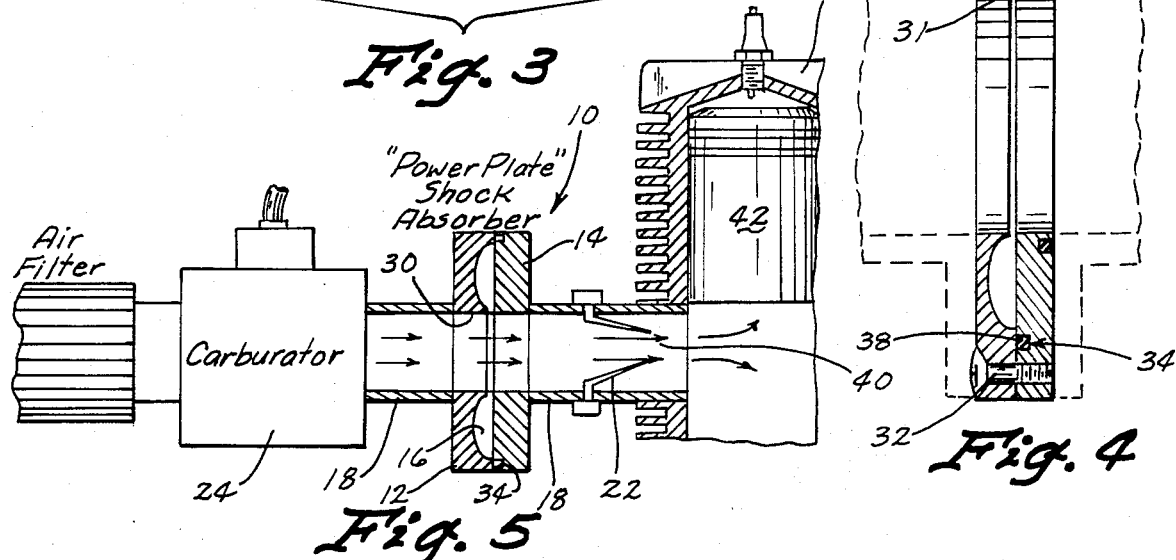

POWER PLATE

BACKGROUND OF THE INVENTION

1. Field of the Invention

The present invention relates generally to internal combustion engines and more particularly to an apparatus for the reduction of shockwaves and regions of pressure differential occurring within the intake manifold.

2. Description of the Prior Art

In order to achieve optimum operational characteristics in an internal combustion engine, proper fuel mixture adequately filing the combustion chamber must occur. Many internal combustion engines are tuned for optimum performance at specific operational levels where majority of the engine use occurs. At lower engine speeds, poor operational characteristics may occur, including poor air-fuel mixture and insufficient filling of the combustion chamber. This results from the inherent design and operational characteristics of the engine. Typically, during the intake phase of the engine, a column of air is pulled in a forward direction toward the piston proceeding through the carburetor venturi where it is mixed with fuel and flows into the intake manifold. The air-fuel mixture then passes into one or more of the cylinder combustion chambers passing by a valving means. As the piston changes direction and starts to compress the air-fuel mixture, the valve means begin to close, however, a portion of the air-fuel mixture escapes rearwardly until the valve means is sealed. Further, a shockwave is created, passing through the closing valving means and into the intake manifold. The column of air-fuel mixture within the intake manifold continues to flow toward the piston due to its own inertia. This moving column of air-fuel mixture is intersected by the escaping shockwave and reverse flowing air-fuel mixture then proceeds toward the closed valve means causing an increase of pressure and other shockwaves. The cumulative result being a series of reverse flowing shockwaves passing back through the intake manifold, increased pressures of the air-fuel mixture at the closed valve resulting in a reserve flow of the air-fuel mixture back through the intake manifold, with some of the air-fuel mixture passing back out through the carburetor venturi, only to subsequently pass forward through the carburetor venturi, thus being a super enriched air-fuel mixture. Further during the flow of the shockwave and reverse pressure within the intake manifold, the complete atomization of the fuel ceases and precipitation of the fuel onto the walls of the intake manifold begins to occur. The overall result being an incorrect mixture of the air-fuel and a resulting incomplete combustion of the mixture producing less than optimum operating characteristics in terms of power, exhaust polutents and fuel efficiency.

In the past there have been many attempts to minimize or prevent these conditions from occuring. Typically, these include a plenum chamber disposed away from the intake manifold and connected to the intake manifold. Examples of these chambers include Matsuo, U.S. Pat. No. 4,368,698; Sakaoka, U.S. Pat. No. 4,356,798; Ishida, U.S. Pat. No. 4,231,329; Malphettes U.S. Pat. No. 3,990,415 and Hunt, U.S. Pat. No. 3,810,454. Many different configurations of plenum chambers are provided, however, all teach the use of a volume chamber mounted away from the intake manifold communicating with the manifold with a line or passageway. The art in this area has advanced the operational characteristic of the internal combustion engine under these conditions, however, there is still room for significant improvement to insure a minimization of shockwaves and pressure waves from interfering with the air-fuel mixture and insure full charging of the combustion chamber.

SUMMARY OF THE INVENTION

According to the present invention, there is provided a first and second plate, the plates being generally disposed about the intake manifold of an internal combustion engine. Disposed within the plates is a circumferencial plenum chamber communicating directly with the intake manifold. The first plate forming one longitudinal side of the circumferential chamber having a partial tear-drop contour and the second plate forming the opposing longitudinal side of the circumferential chamber. An O-ring seal is disposed on the outward side of the chamber between the plates to form an air tight seal when the plates are locked together. The plates are further secured together and to the manifold in a generally air tight manner through conventional means.

Reverse flowing shockwaves and regions of high pressure air-fuel mixtures moving outwardly through the intake manifold enter the circumferential plenum chamber in an omnidirectional pattern where their energy is dissipated and stored through the unidirectional expansion of the high pressure regions and/or shockwave concussions within the chamber, until the normal forward flow of the air-fuel mixture occurs in the intake manifold.

DESCRIPTION OF THE DRAWINGS

FIG. 1 is a diagram in block form illustrating the conventional pertinent components of an internal combustion engine with the respective portion of the power plate of the present invention shown;

FIG. 2 is a side perspective view of the power plate;

FIG. 3 is an internal exploded view of the power plate;

FIG. 4 is a cross-sectional view of the power plate taken along lines 4—4 of FIG. 2 with dashed lines illustrating the intake manifold;

FIG. 5 is a partial cross-sectional view of FIG. 1 illustrating by arrows the flow of the column of air-fuel mixture from the carburetor to the engine; and FIG. 6 is a partial cross-sectional view of FIG. 1 illustrating by arrows the progressive movement of the air-fuel mixture and shockwaves during the compression cycle of the engine.

DESCRIPTION OF THE PREFERRED EMBODIMENT

Referring now to the drawings wherein like reference numerial designate identical or corresponding parts throughout the several views, the power plate of the present invention is illustrated generally at 10 in FIG. 1.

According to the present invention, the power plate 10 (FIGS. 1-4) includes a first plate 12 and a second plate 14 with a circumferential plenum chamber 16 disposed therein and communicating with an intake manifold 18 of an internal combustion engine 20.

Specifically, the power plate 10 (FIGS. 1, 3, 5 and 6) is positioned in the intake manifold 18 between the air-fuel mixture inlet valve 22 of the engine 20 and the carburetor 24. The first and second plates 12 and 14 respectively are disc-shaped and mounted directly onto the manifold 18 and held in place by conventional bolts 26 attaching to flanges 28. An interior portion 30 is cut away to match the interior diameter of the manifold 18. The first plate 12 includes the cut out portion forming a circumferential plenum chamber 16 (FIGS. 3 and 4). The plenum chamber 16 as cut into the plate 12 is shaped as best described as a sectional tear-drop configuration along the longitudinal axis of the chamber 16. This shape minimizes the resistance of the inward flow into the plenum chamber 16 of shockwaves and regions of higher pressure air-fuel mixtures. This specific shape of the chamber 16 is a function of tuning whereby obtaining the desired result specifically with reference to a two cycle engine. Other shapes and configurations would be as applicable to the shape of the plenum chamber 16 where specific results and specifications of the engine dictate. The base 31 of the chamber 16 communicates directly with the manifold 18 to permit free exchange of volume between the two regions. The plates 12 and 14 are joined together by threaded bolts 32 pulling the first plate 12 against the second plate 14 with an O-ring seal 34 comprises of an O-ring groove 36 and an O-ring 38 extending on the outward end of the chamber 16 which seals the plates 12 and 14 together upon tightening of the bolts 32. The seal 34 is normally air tight to prevent the air-fuel mixture from leaking by the plates 12 and 14.

During operation of the engine 20, the direction of movement of the column of air-fuel mixture as illustrated by arrows 40 in FIG. 5 moves forward passing through the carburetor 24, the manifold 18, power plate 10 and the valve 22 during the intake phase of the engine 20. Upon the initiation of the transfer cycle in a two stroke engine (FIG. 6), the piston 42 of the engine 20 changes direction resulting in a concussion effect on the air-fuel mixture and the valve 22 begins to close resulting in a partial escape of the air-fuel mixture until the valve 22 seals. A shock wave occurs as the valve closes and seals. The initial forward flow of the column of the air-fuel mixture contacts the shockwaves and escaping air-fuel mixture and, further striking the closed valve, to further increase the pressure of the air-fuel mixture in close proximity of the closed valve 22, thus resulting in a reversal of the direction of movement of the air-fuel mixture. The net result as is illustrated in FIG. 6 is a rearward movement of accompanying shockwaves and region of increased pressure of the air-fuel mixture passing into the chamber 16. The shockwaves and regions of high pressure pass smoothly into the chamber 16 and through the configuration of the chamber 16, the shockwave is dissipated in an omnidirection pattern. The higher pressure air-fuel mixture mixes therein and is stored until the reverse flow of the air-fuel mixture changes direction and the higher pressure air-fuel mixture can mix with the normal forward flow of the air-fuel mixture. The net result being significantly less turbulance of the air-fuel mixture with a more stable and predictable air-fuel mixture reaching the combustion chamber with the combustion chamber receiving a fuller charge of the air-fuel mixture.

Further as illustrated in the drawings, the engine 20 and the inlet value 22 would be typically described as a two cycle engine where the air-fuel mixture passes into the crank case from the intake manifold 18. It is to be appreciated that the power plate 10 is as adaptable to other types of engines such as four cycle engines when the air-fuel mixture passes directly into the combustion chamber and, in fact, other mechanical devices utilizing a piston exhibiting reciprocating motion within a given area for the movement of a gas and/or gas liquid combination, as for example in an air compressor.

Obviously, many modifications and variations of the present invention are possible in light of the above teachings. It is therefore to be understood that, within the scope of the pending claims, the invention may be practiced otherwise than as specifically described.

I claim:

1. Apparatus for reducing and minimizing the effects of shockwaves and pressure differentials occurring in an intake manifold of an internal combustion engine, said engine having a combustion chamber communicating with the intake manifold and a carburetor, said carburetor having air passing therethrough to receive a material amount of fuel, all of which flows to the combustion chamber, the apparatus comprising:

a plenum chamber means disposed intermediate adjacent spaced portions of the intake manifold at a location between the combustion chamber and carburetor and communicating directly with the intake manifold for absorbtion of shockwaves and pressure differential passing through the intake manifold, said plenum chamber means including a first and a second plate, said plates being generally concentrically disposed about and having annular sections extending radially outwardly from the intake manifold and forming a circumferential chamber in said annular sections in communication along its inner circumference with the intake manifold via a slot, the first plate forming one side of the circumferential chamber having a contoured recess containing said slot comprising a curved surface in a direction facing away from said combustion chamber and the second plate forming an opposing substantially flat side of the circumferential chamber, the first and second plates being secured together and to the respective adjacent portions of the intake manifold in a generally air tight manner with said first plate being located between said carburetor and said second plate so as to enhance said absorbtion during back flow.

2. Apparatus as claimed in claim 1 wherein the one side of the circumferential chamber extends along the longitudinal axis of the chamber forms a partial tear-drop contour shape.

* * * * *